United States Patent
Gates et al.

(10) Patent No.: US 8,616,505 B2
(45) Date of Patent: Dec. 31, 2013

(54) ARTICULATED ARTICLE HOLDER

(75) Inventors: Travis Gates, West Jordan, UT (US); Stacey Gates, Riverton, UT (US); Jason Tubbs, North Ogden, UT (US)

(73) Assignee: All Rite Products, Inc., West Jordan, UT (US)

( * ) Notice: Subject to any disclaimer, the term of this patent is extended or adjusted under 35 U.S.C. 154(b) by 0 days.

(21) Appl. No.: 13/300,154

(22) Filed: Nov. 18, 2011

(65) Prior Publication Data

US 2012/0292473 A1    Nov. 22, 2012

Related U.S. Application Data

(60) Provisional application No. 61/414,998, filed on Nov. 18, 2010.

(51) Int. Cl.
*E21F 17/02* (2006.01)
*F16L 3/00* (2006.01)

(52) U.S. Cl.
USPC ............... 248/62; 248/60; 248/63; 211/60.1; 211/89.01; 211/124

(58) Field of Classification Search
USPC ............. 248/291.1, 60, 74.2, 74.4, 67.7, 70, 248/214, 229.13, 74.1, 229.15, 229.25, 248/228.6, 230.6, 231.71, 231.51, 231.81, 248/230.4, 230.7, 229.16, 229.23, 229.26, 248/228.4, 228.7; 224/442, 413, 420; 211/64, 70.6, 60.1, 70.5, 89.01, 70.8, 211/124; 426/116–118; 264/258, 316; 156/212

See application file for complete search history.

(56) References Cited

U.S. PATENT DOCUMENTS

| | | | | |
|---|---|---|---|---|
| 2,220,234 A | * | 11/1940 | Hadaway | 248/538 |
| 2,632,619 A | * | 3/1953 | Wilson | 248/316.7 |
| 2,735,663 A | * | 2/1956 | Holt | 366/211 |
| 3,167,346 A | * | 1/1965 | Miller | 294/82.34 |
| 3,477,587 A | * | 11/1969 | Hart | 211/64 |
| 3,792,829 A | * | 2/1974 | Fickett | 248/534 |
| 3,876,079 A | * | 4/1975 | Elkins et al. | 211/64 |
| 4,009,852 A | * | 3/1977 | Bulanda et al. | 248/68.1 |
| 4,108,313 A | * | 8/1978 | Bogar, Jr. | 211/64 |
| 4,607,772 A | | 8/1986 | Hancock | |
| 5,251,857 A | * | 10/1993 | Grice et al. | 248/62 |
| 5,305,978 A | * | 4/1994 | Current | 248/230.4 |
| 5,344,032 A | * | 9/1994 | Ramsdell | 211/64 |
| 5,400,900 A | * | 3/1995 | Myers et al. | 206/289 |
| 5,531,335 A | * | 7/1996 | Chen | 211/124 |
| 5,873,550 A | * | 2/1999 | Phillips | 248/73 |
| 6,186,383 B1 | * | 2/2001 | Kobdish | 224/420 |
| 6,508,442 B1 | * | 1/2003 | Dolez | 248/74.1 |
| 6,634,530 B1 | * | 10/2003 | Black | 224/401 |
| 6,637,707 B1 | * | 10/2003 | Gates et al. | 248/224.7 |
| 6,681,971 B2 | * | 1/2004 | Laverack et al. | 224/319 |
| 6,682,031 B2 | * | 1/2004 | Evans et al. | 248/214 |

(Continued)

*Primary Examiner* — Nkeisha Smith
(74) *Attorney, Agent, or Firm* — Thorpe North & Western LLP

(57) ABSTRACT

An articulated article holder comprises an attachment base, configured to be attached to a support structure or to a component of a vehicle. A holding member is configured to receive and hold an article therein, the holding member being coupled to the attachment base and including two generally upright arms which collectively define a containment area therebetween. At least one of the upright arms includes an articulated joint formed or integrated therein to allow at least one segment of the arm to move between at least two differing positions.

15 Claims, 4 Drawing Sheets

(56) References Cited

U.S. PATENT DOCUMENTS

| | | | |
|---|---|---|---|
| 6,793,109 B2* | 9/2004 | Gates et al. | 224/401 |
| 6,793,186 B2* | 9/2004 | Pedersen | 248/229.13 |
| 6,869,051 B2* | 3/2005 | Bishop | 248/71 |
| 7,047,771 B2* | 5/2006 | Tanos | 70/16 |
| 7,290,690 B2* | 11/2007 | Hancock | 224/441 |
| 7,337,934 B2* | 3/2008 | Alling et al. | 224/401 |
| 7,681,768 B2* | 3/2010 | Gates et al. | 224/440 |
| 7,980,522 B2* | 7/2011 | Anderson et al. | 248/316.5 |
| 8,161,605 B2* | 4/2012 | Reichel | 24/20 R |
| 8,294,583 B2* | 10/2012 | Sayegh et al. | 340/572.9 |
| 2003/0146351 A1* | 8/2003 | Bishop | 248/71 |
| 2011/0204192 A1* | 8/2011 | Geppert et al. | 248/74.1 |

* cited by examiner

ARTICULATED ARTICLE HOLDER

BACKGROUND OF THE INVENTION

1. Field of the Invention

The present invention relates generally to devices suitable for holding a variety of articles. More particularly, the present invention relates to such holding devices that are mountable upon an ATV or a similar vehicle.

2. Related Art

Holding devices for use on vehicles have been utilized for many years to allow operators of the vehicles to carry various articles on the vehicle. For example, article holders such as those disclosed in U.S. Pat. No. 4,607,772 (to Hancock) have been used to carry hunting and fishing equipment, tools, etc., on motorcycles, snowmobiles, side-by-side vehicles, all-terrain vehicles and other vehicles (collectively referred to herein as "ATVs"). Most such devices typically include two or more arms between which the article is held. It is often desired to provide these arms with a degree of flexibility, to allow them to separate as the article is inserted within the holder, and return to a relaxed or default position after the article is inserted. This is particularly true when the article to be held is of greater diameter than the opening between the two arms.

However, the balance between providing a degree of flexibility while also providing durable and relatively rigid arms often results in arms that can be relatively easily broken or bent during use, rendering the article holder useless, or at least significantly decreasing the effectiveness of the article holder.

SUMMARY OF THE INVENTION

In accordance with one embodiment, the invention provides an articulated article holder, including an attachment base, configured to be attached to a support structure or to a component of a vehicle. A holding member can be configured to receive and hold an article therein. The holding member can be coupled to the attachment base and can include two generally upright arms which collectively define a containment area therebetween. At least one of the upright arms can include an articulated joint formed or integrated therein to allow at least one segment of the arm to move between at least two differing positions.

In accordance with another aspect of the invention, a method of forming an articulated article holder is provided, including: forming an attachment base configured to be attached to a support structure or to a component of a vehicle, with a holding member extending from the attachment base, the holding member being configured to receive and hold an article therein and including two upright arms which collectively define a containment area therebetween; and forming an articulated joint in at least one of the upright arms to allow at least one segment of the arm to move between at least a first, default orientation and a second, extended orientation.

Additional features and advantages of the invention will be apparent from the detailed description which follows, taken in conjunction with the accompanying drawings, which together illustrate, by way of example, features of the invention.

DETAILED DESCRIPTION

Figure 1:
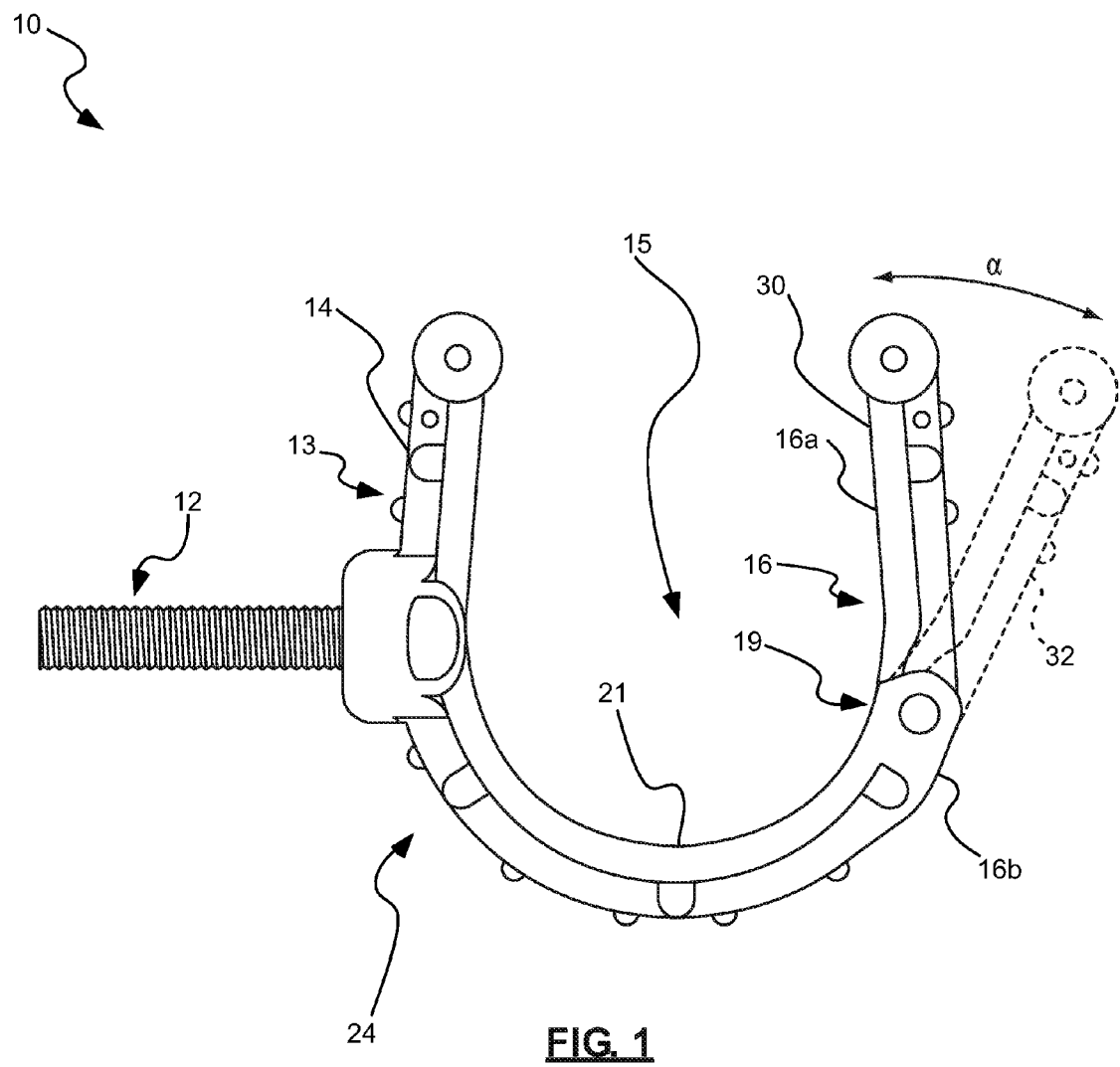
FIG. 1 is a front view of an inner core of an article holder in accordance with an embodiment of the invention, shown in two different degrees of articulated movement.

Before the present invention is disclosed and described, it is to be understood that this invention is not limited to the particular structures, process steps, or materials disclosed herein, but is extended to equivalents thereof as would be recognized by those of ordinarily skilled in the relevant arts. It should also be understood that terminology employed herein is used for the purpose of describing particular embodiments only and is not intended to be limiting.

It must be noted that, as used in this specification and the appended claims, the singular forms "a" and "the" can include plural referents, unless the context clearly dictates otherwise. Thus, for example, reference to an "article holder" can include reference to one or more of such holders.

DEFINITIONS

In describing and claiming the present invention, the following terminology will be used in accordance with the definitions set forth below.

Relative directional terms, such as "upper," "lower," "top," bottom," etc., are used herein to aid in describing various features of the present system. It is to be understood that such terms are generally used in a manner consistent with the understanding one of ordinary skill in the art would have of such systems. Such terms should not, however, be construed to limit the present invention.

As used herein, the term "substantially" refers to the complete, or nearly complete, extent or degree of an action, characteristic, property, state, structure, item, or result. As an arbitrary example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained.

The use of "substantially" is equally applicable when used in a negative connotation to refer to the complete or near complete lack of an action, characteristic, property, state, structure, item, or result. As another arbitrary example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint.

As used herein, the term "auxiliary device" or "article" is to be understood to refer to an object that can be mounted to at least a portion of an ATV in order to be transported by the ATV. Examples of auxiliary devices include, without limitation, tools, such as shovels, rakes, picks, etc., guns, bows, camera equipment, scopes, and also intermediate structures, such as tripods, rests, etc., on which such devices can be mounted or rested.

Distances, forces, weights, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited.

As an illustration, a numerical range of "about 1 inch to about 5 inches" should be interpreted to include not only the explicitly recited values of about 1 inch to about 5 inches, but also include individual values and sub-ranges within the indicated range. Thus, included in this numerical range are individual values such as 2, 3, and 4 and sub-ranges such as from 1-3, from 2-4, and from 3-5, etc.

This same principle applies to ranges reciting only one numerical value and should apply regardless of the breadth of the range or the characteristics being described.

INVENTION

As generally illustrated in the figures, the invention provides an articulated article holder 10 that can include an attachment base 12 that can be configured to be attached to a support structure or to a component of a vehicle. While no support structures are vehicles are shown in the figures, one of ordinary skill in the art would readily appreciate that the attachment base 12 can easily be attached to a variety of known structures suitable for such attachment. A variety of commercially available mounting devices are offered that will accept attachment base 12 for purposes of attachment to an ATV, automobile, truck, etc. A holding member 13 can be configured to receive and hold an article (shown generically at 17 in FIG. 2) therein. The holding member is typically coupled to the attachment base and can include two generally upright arms 14, 16 which collectively define a containment area 15 therebetween.

At least one of the upright arms (16 in the example shown in FIG. 1) can include an articulated joint 19 that can be formed therewith or integrated therein. The articulated joint allows at least one segment of the arm to move between at least two differing positions. In the embodiment of FIG. 1, the rightmost arm 16 includes two segments, 16a and 16b, which are positioned on opposing sides of the joint 19. Thus, articulation of the joint results in movement of segment 16a relative to segment 16b while segment 16b generally remains substantially immobile relative to the remainder of the holder (e.g., relative to saddle 21).

As will be appreciated from FIG. 1, the upper segment 16a of upright arm 16 can move from a first, relaxed or default position (shown at 30 in FIG. 1), through a range of motion (represented by angle α in FIG. 1) to the second, extended position (indicated at 32). While the range of motion provided can vary, in one example the range of motion is about 45 degrees. In another example, the range of motion is about 30 degrees.

Figure 4:
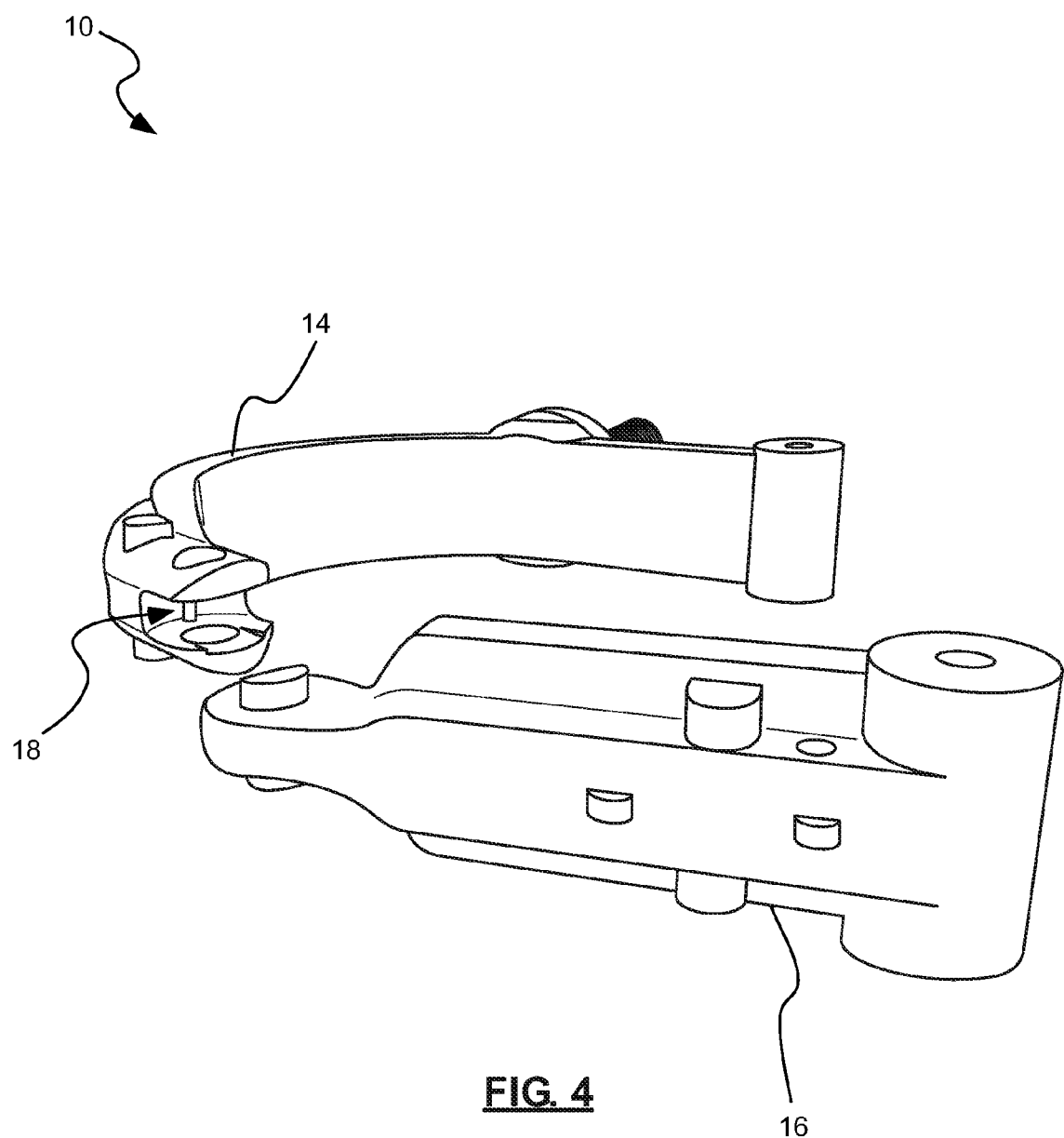
FIG. 4 is a more detailed perspective view of the inner core of FIG. 1, shown in an exploded configuration.

Limitation of movement of the segment 16a can be accomplished in a number of manners. In one aspect, shown by example in FIG. 4, one or more pins 18 or similar structure can be present to limit movement of the arm segment. Of course, a variety of alternative structures can be utilized to restrict the range of motion of the components that form the joint, as would be appreciated by one of ordinary skill in the art having possession of this disclosure. For example, the shape of the arm segments 16a and 16b can be tailored such the relative motion of the two is limited (e.g., one can include blocking walls that contact the other at extreme ends of relative motion).

Figure 3:
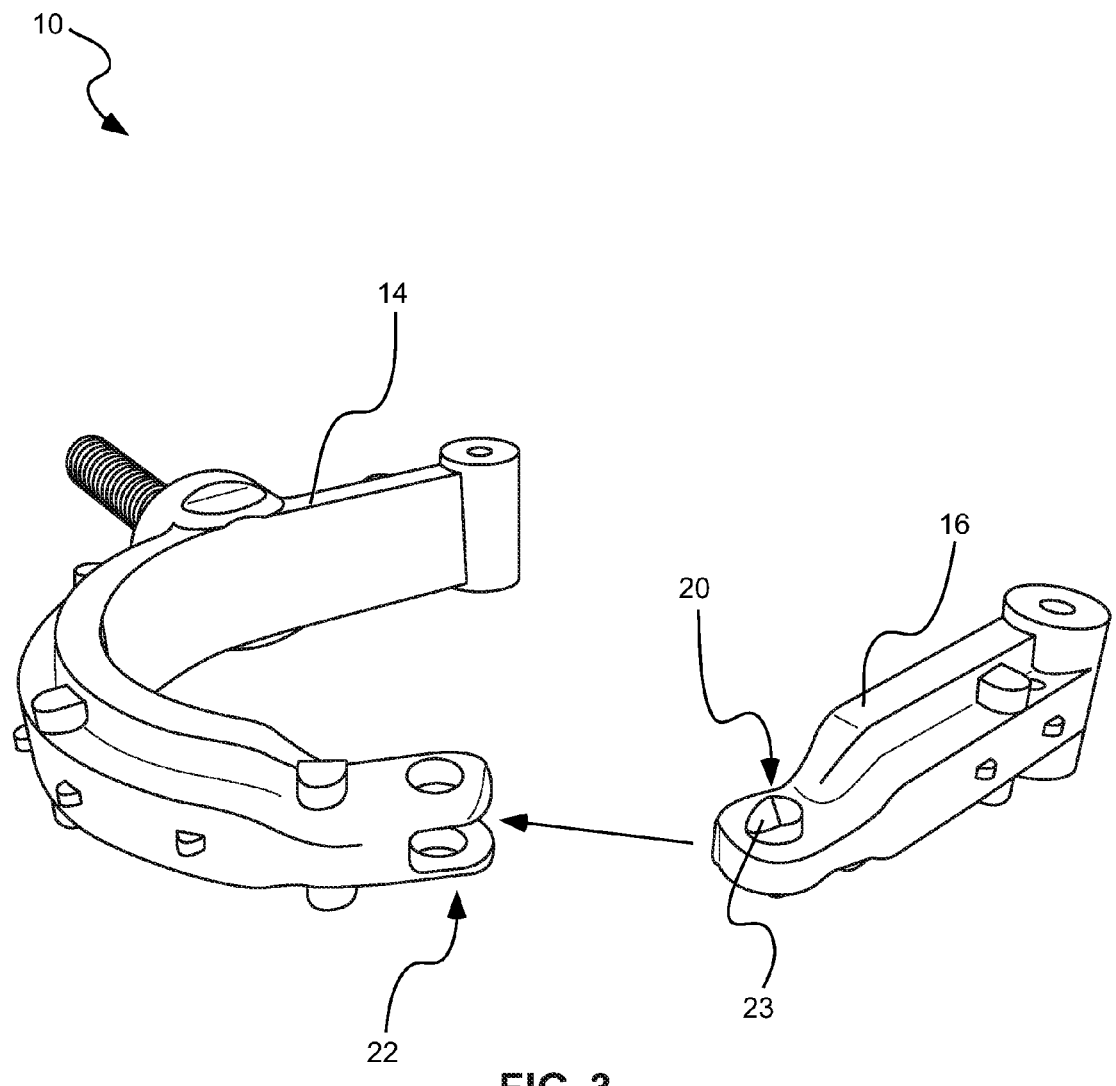
FIG. 3 is a perspective view of the inner core of FIG. 1, shown in an exploded configuration.

The articulated joint 19 can be formed in a number of manners. In the example shown in FIG. 3, in one aspect of the invention, the joint can include a pin 20 having one or more tapered sides 23 that can relatively easily slide into yoke 22. However, once secured within the yoke, the pin 20 cannot easily be removed therefrom. Other suitable arrangements can also be provided, as would occur to one of ordinary skill in the art having possession of this disclosure.

Advantageously, the articulated joint can be positioned high enough on the arm 16 such that the saddle 21 can absorb and carry most of the weight of an article positioned within the holder, without placing significant load on the joint itself. In one non-limiting example, shown in FIG. 2, the saddle is on the order of about 1.5 inches in width, with the joint positioned about ½ inch to 1 inch above the uppermost surface of the saddle. In this manner, the articulated joint can serve its purpose of providing relative expansion of the two upright arms while being positioned in a location that minimizes risk that the articulated joint will be damaged while the article is being carried by the holder (or that the function of the articulated joint will be diminished).

Figure 2:
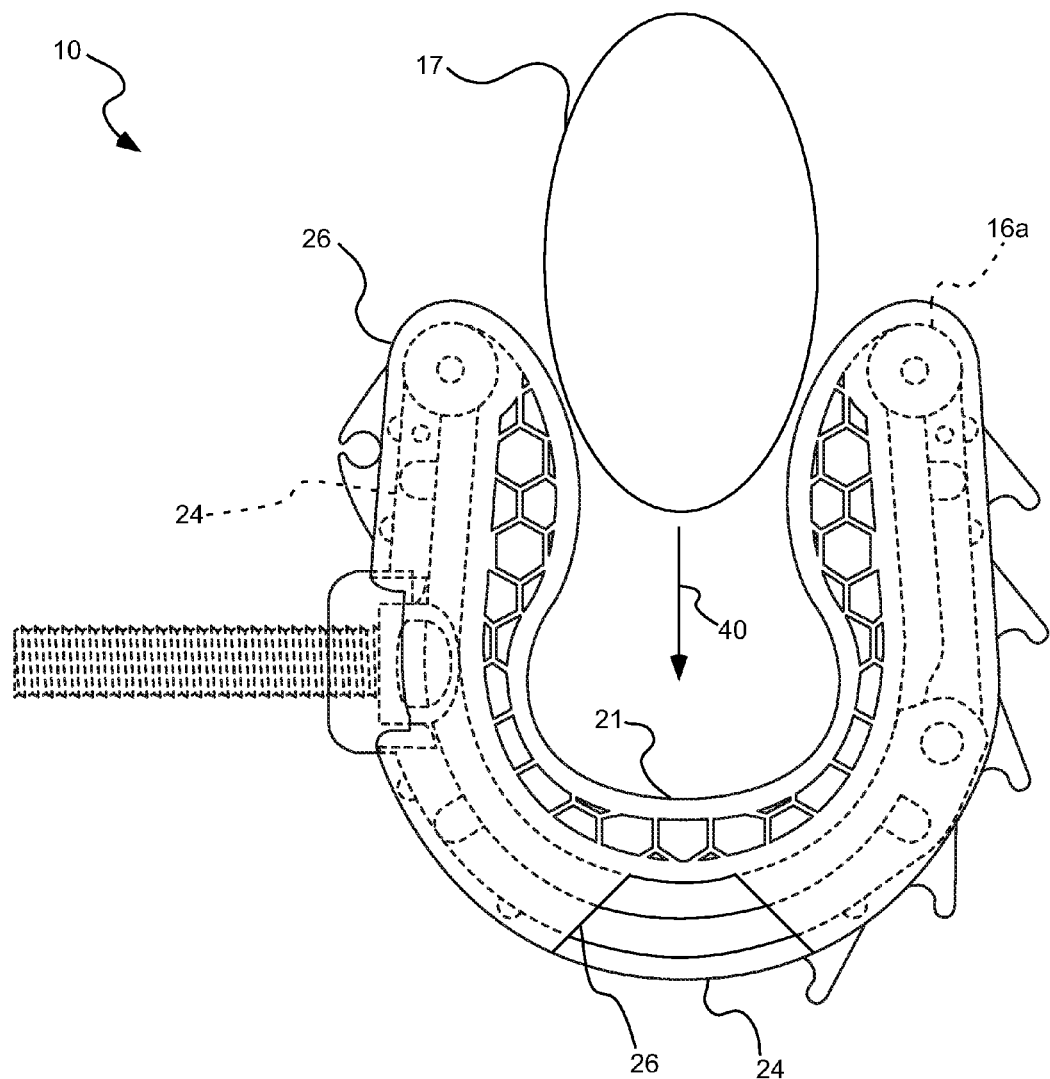
FIG. 2 is a front view of the article holder of FIG. 1, shown with an outer casing disposed about the inner core of FIG. 1.

As best appreciated from FIG. 2, in one aspect of the invention, the holding member can include a relatively rigid internal portion 24 and a relatively pliable outer casing 26. The articulated joint can be formed in, or as a part of, the relatively rigid internal portion. In this manner, the outer casing can apply a restorative force that tends to resist movement of the joint within the casing, and tends to return the segment 16a to a default (or relaxed) position when no external force is applied to the segment. This can be accomplished without requiring the presence of other mechanical biasing elements that must be formed as part of the joint, or coupled to the joint. Such other mechanical biasing elements might otherwise add greatly to the complexity of the joint, and also increase the risk of damage that would affect the functionality of the joint.

In this manner, the articulated joint can allow segment 16a to move outwardly as an article is inserted into the containment area 15. As shown by example at 40 in FIG. 2, as article 17 is forced downward into the containment area, arm segment 16a will pivot outward (relative to saddle 21). As the article passes through the arms, it will come to rest in the saddle 21. At this point (depending upon the size of the article), the restorative force applied by the outer casing to the inner core either returns arm segment 16a to its relaxed or default position, or partially returns the segment to the relaxed or default position. If the arm segment 16a does not return to the relaxed position, it will continue to apply a force to the article, which can aid in retaining the article within the saddle.

The extent to which the outer casing can extend around the internal portion can vary. In one non-limiting example, the outer casing substantially completely encapsulates the inner core. In other embodiments, the inner core may extend through the outer casing, or be exposed in various areas, but the outer casing will generally encompass the articulated joint (or at least areas functionally associated with the articulated joint), to enable the restorative force to be applied by the outer casing to the inner core.

Substantially encasing (or at least partially encasing) the inner core with the outer casing provides a number of benefits. In one example, force applied to the outer casing as the inner core is moved is spread throughout various segments of the outer casing—minimizing point stresses in the outer casing, which minimizes the risk of failure of the outer casing. In addition, as the restorative force is applied across a broad surface area of the inner core by the outer casing, the likelihood of failure of the restorative force mechanism is much lower than if a conventional device were used (e.g., a mechanical spring or band). Depending upon the embodiment of the invention, however, mechanical springs or bands, or the like, can also be utilized to provide the restorative force.

The inner core can be formed from a variety of relatively rigid materials including, without limitation Nylon 6 or Nylon 66. The outer casing is typically formed from a much more pliable material, such as thermoplastic rubber ("TPR"), to provide the restorative force to the articulated joint.

The present system can advantageously be used to hold items that might otherwise be too large to fit within (or between) the two upright arms found on many conventional article holders. In the case that the article is larger than the arm opening, prior art devices were at great risk of being broken (as many users would attempt to force a fit even when the article was oversized). In addition, the present invention functions well in cases where the article being held is only slightly too large for the opening: in this case, the articulated joint maintains a gripping force on the article while the device is performing normally. With prior art devices, even if a force fit were accomplished, the arms would be placed under a constant stress while the article was being held, leading to premature failure of the device.

It is to be understood that the above-referenced arrangements are illustrative of the application for the principles of the present invention. It will be apparent to those of ordinary skill in the art that numerous modifications can be made without departing from the principles and concepts of the invention as set forth in the claims.

We claim:

1. An articulated article holder, comprising:
   an attachment base, configured to be attached to a support structure or to a component of a vehicle;
   a holding member configured to receive and hold an article therein, the holding member extending from the attachment base and including two upright arms which collectively define a containment area therebetween, the holding member including a relatively rigid internal portion and a relatively pliable outer casing;
   at least one of the upright arms including an articulated joint formed or integrated therein to allow at least one segment of the arm to move between at least a first, default orientation and a second, extended orientation, the articulated joint being formed in or by the relatively rigid internal portion of the holding member; and
   wherein the outer casing applies a restorative force to return the segment to the first, default orientation when no external force is applied to the segment.

2. The holder of claim 1, wherein the outer casing substantially completely circumscribes the internal portion.

3. The holder of claim 1, wherein the segment is restricted from moving more than about 45 degrees from the first orientation to the second orientation.

4. The holder of claim 3, wherein the segment is restricted from moving more than about 30 degrees from the first orientation to the second orientation.

5. The holder of claim 1, wherein the holding member includes blocking structure associated therewith that physically limits movement of the segment in at least one end point of travel of the segment.

6. The holder of claim 1, wherein the attachment base includes a cradle formed therein, the cradle being configured to be contacted by the article held therein, and wherein the articulated joint is positioned above the cradle.

7. The holder of claim 1, wherein the segment is substantially restricted to movement in a plane parallel to a plane formed between the upright arms.

8. A method of forming an articulated article holder, comprising:
   forming an attachment base configured to be attached to a support structure or to a component of a vehicle, with a holding member extending from the attachment base, the holding member being configured to receive and hold an article therein and including two upright arms which collectively define a containment area therebetween, the holding member including a relatively rigid internal portion and a relatively pliable outer casing; and
   forming an articulated joint in at least one of the upright arms to allow at least one segment of the arm to move between at least a first, default orientation and a second, extended orientation, the articulated joint being formed in or by the relatively rigid internal portion of the holding member; wherein
   the outer casing applies a restorative force to return the segment to the first, default orientation when no external force is applied to the segment.

9. The method of claim 8, further comprising forming the outer casing about the internal portion so as to substantially completely encase the internal portion.

10. The method of claim 8, further comprising forming the outer casing about the internal casing so as to only partially circumscribe the internal portion.

11. The method of claim 8, further comprising forming or attaching blocking structure to the holding member to physically limit movement of the segment in at least one end point of travel of the segment.

12. The method of claim 11, wherein the segment is restricted from moving more than about 45 degrees from the first orientation to the second orientation.

13. The method of claim 11, wherein the segment is restricted from moving more than about 30 degrees from the first orientation to the second orientation.

14. The method of claim 8, wherein the attachment base includes a cradle formed therein, the cradle being configured to be contacted by the article held therein, and wherein forming the articulated joint in the at least one of the upright arms includes positioning the articulated joint above the cradle.

15. The method of claim 8, wherein the articulated joint is substantially restricted to movement in a plane parallel to a plane formed between the upright arms.

* * * * *